United States Patent
Cho et al.

(10) Patent No.: US 9,706,339 B2
(45) Date of Patent: Jul. 11, 2017

(54) MOBILE TERMINAL APPARATUS HAVING NEARFIELD WIRELESS COMMUNICATION READER, DEVICE HAVING NEARFIELD WIRELESS COMMUNICATION TAG AND METHOD THEREOF TO CONNECT TO AP

(71) Applicant: Samsung Electronics Co., Ltd, Suwon-si, Gyeonggi-do (KR)

(72) Inventors: Kyu-hyung Cho, Suwon-si (KR); Kyung-tack Kwon, Seoul (KR); Jin-choul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 13/848,900

(22) Filed: Mar. 22, 2013

(65) Prior Publication Data

US 2013/0252547 A1    Sep. 26, 2013

(30) Foreign Application Priority Data

Mar. 23, 2012 (KR) ......................... 10-2012-0030187

(51) Int. Cl.
*H04B 5/00* (2006.01)
*H04W 4/00* (2009.01)
(Continued)

(52) U.S. Cl.
CPC ......... *H04W 4/008* (2013.01); *H04L 41/0846* (2013.01); *H04W 12/04* (2013.01); *H04L 41/082* (2013.01)

(58) Field of Classification Search
CPC .. H04W 4/008; H04W 12/04; H04L 41/0846; H04L 41/082; H04B 5/0031; H04B 5/02
(Continued)

(56) References Cited

U.S. PATENT DOCUMENTS

| 6,957,262 B2* | 10/2005 | Kimura et al. ............... 709/227 |
| 2005/0079817 A1* | 4/2005 | Kotola ................... G06Q 20/20 |
| | | 455/41.2 |

(Continued)

FOREIGN PATENT DOCUMENTS

| EP | 1793531 | 6/2007 |
| EP | 2285163 | 2/2011 |

(Continued)

OTHER PUBLICATIONS

International Search Report issued in PCT/KR/2013/002408 on Jul. 30, 2013.

(Continued)

*Primary Examiner* — Nguyen Vo
(74) *Attorney, Agent, or Firm* — Staas & Halsey LLP

(57) ABSTRACT

A method of connecting an Access Point (AP) is disclosed. The method includes, if a device having a nearfield wireless communication tag is tagged with a mobile terminal apparatus having a nearfield wireless communication reader, providing connecting information stored on the device to the mobile terminal apparatus, connecting the mobile terminal apparatus, receiving AP information from the connected mobile terminal apparatus, and connecting to an AP using the received AP information. As a result, connecting to the AP can be implemented more conveniently.

4 Claims, 7 Drawing Sheets

(51) Int. Cl.
*H04L 12/24* (2006.01)
*H04W 12/04* (2009.01)

(58) Field of Classification Search
USPC .............................. 455/41.1, 41.2; 370/338
See application file for complete search history.

(56) References Cited

U.S. PATENT DOCUMENTS

| | | | | |
|---|---|---|---|---|
| 2007/0121541 | A1* | 5/2007 | Matsuo | 370/328 |
| 2007/0138277 | A1* | 6/2007 | Kazama et al. | 235/439 |
| 2007/0254614 | A1* | 11/2007 | Muralidharan et al. | 455/307 |
| 2008/0220878 | A1 | 9/2008 | Michaelis | |
| 2009/0216606 | A1* | 8/2009 | Coffman | G06Q 30/02 |
| | | | | 705/14.1 |
| 2010/0015955 | A1* | 1/2010 | Backlund | H04W 76/04 |
| | | | | 455/414.1 |
| 2010/0165879 | A1* | 7/2010 | Gupta | H04L 12/2807 |
| | | | | 370/254 |
| 2010/0205655 | A1* | 8/2010 | Mokuya | 726/4 |
| 2010/0254349 | A1* | 10/2010 | Aibara et al. | 370/331 |
| 2010/0311330 | A1* | 12/2010 | Aibara et al. | 455/41.2 |
| 2011/0039494 | A1* | 2/2011 | Shon et al. | 455/41.1 |
| 2011/0122835 | A1* | 5/2011 | Naito et al. | 370/329 |
| 2011/0244964 | A1* | 10/2011 | Glynne-Jones | A63F 13/12 |
| | | | | 463/40 |
| 2011/0275316 | A1* | 11/2011 | Suumaki et al. | 455/41.1 |
| 2012/0069132 | A1* | 3/2012 | Kato | H04L 12/1827 |
| | | | | 348/14.02 |
| 2013/0036231 | A1* | 2/2013 | Suumaki | H04W 12/04 |
| | | | | 709/228 |
| 2014/0080469 | A1* | 3/2014 | Ko | H04W 4/20 |
| | | | | 455/418 |
| 2015/0057027 | A1* | 2/2015 | Nakata | A63F 13/00 |
| | | | | 455/456.3 |

FOREIGN PATENT DOCUMENTS

| | | |
|---|---|---|
| EP | 2364004 | 9/2011 |
| EP | 2420854 | 2/2012 |
| KR | 2007-0095654 | 10/2007 |
| KR | 2011-0037110 | 4/2011 |
| WO | 2008/059460 | 5/2008 |

OTHER PUBLICATIONS

Extended European Search Report dated Dec. 2, 2015 in European Patent Application No. 13763833.4.

* cited by examiner

MOBILE TERMINAL APPARATUS HAVING NEARFIELD WIRELESS COMMUNICATION READER, DEVICE HAVING NEARFIELD WIRELESS COMMUNICATION TAG AND METHOD THEREOF TO CONNECT TO AP

CROSS-REFERENCE TO RELATED APPLICATIONS

This application claims priority from Korean Patent Application No. 10-2012-0030187, filed on Mar. 23, 2012, in the Korean Intellectual Property Office, the disclosure of which is incorporated herein by reference in its entirety.

BACKGROUND OF THE INVENTION

1. Field of the Invention

Apparatuses, device, and methods consistent with what is disclosed herein relate to a mobile terminal apparatus, a device, and a method of connecting to an Access Point (AP), and more specifically, to a mobile terminal apparatus having a nearfield wireless communication reader, a device having a nearfield wireless communication tag, and a method thereof to connect to an AP.

2. Description of the Related Art

Advancement of electronic technologies has enabled development of various types of electronic apparatuses. Further, as wireless LAN is actively used recently, apparatuses having wireless LAN functions are provided. These apparatuses connect to a network via an Access Point (AP). Thus, to connect to the network, setting processes to select an AP and to connect to the AP should be implemented.

However, a method for a user to input AP information and to connect to an AP may not be easy.

To connect to an AP, AP information such as Service Set IDentifier (SSID) or a network key should be inputted. However, since home gateway or a set-top box does not have a display, providing a user interface (UI) in order to input AP information is impossible. Further, in case apparatuses having a display such as the TV do not include proper means to input AP information, connecting to an AP becomes more difficult.

Further, in order to connect to an AP, a user should remember AP information. Thus, a user should write down AP information separately or remember AP information for use to connect to an AP.

Therefore, connecting to an AP may not be easy in conventional methods.

SUMMARY OF THE INVENTION

Exemplary embodiments of the present inventive concept overcome the above disadvantages as well as providing other features and utilities that overcome disadvantages not described above.

The invention is proposed to solve the problems as described above, and provides a device which allows connecting information to a mobile terminal apparatus by utilizing a nearfield wireless communication tag, receives AP information from the mobile terminal apparatus connected thereto, and connects to an Access Point (AP) according to the received AP information, and a mobile terminal apparatus and methods thereof for providing the AP information.

Additional features and utilities of the present general inventive concept will be set forth in part in the description which follows and, in part, will be obvious from the description, or may be learned by practice of the general inventive concept.

Exemplary embodiments of the present inventive concept include a method of providing AP information in the mobile terminal apparatus having a nearfield wireless communication reader is provided, which includes providing a mobile terminal apparatus with connecting information to communicate with the device, if the mobile terminal apparatus including a nearfield wireless communication reader approaches within a range in which nearfield wireless communication with the device is available, connecting communication to the mobile terminal apparatus by allowing access of the mobile terminal apparatus, receiving AP information from the mobile terminal apparatus and connecting to an AP using the received AP information.

The method may further include converting to a soft AP mode or a Wi-Fi direct mode before connecting communication to the mobile terminal apparatus, and converting to a station mode, if the AP information is received.

The method may further include performing a home gateway function, if connected to the AP.

The method may include SSID and key information of the device, and the AP information comprises SSID and key information to connect to the AP.

Exemplary embodiments of the present inventive concept also include a method of providing AP information of a mobile terminal apparatus having a nearfield wireless communication reader, the method includes receiving connecting information stored in a nearfield wireless communication tag, if the mobile terminal apparatus approaches within an range in which communication with other device having the nearfield wireless communication tag is available, if the connecting information is received, disconnecting from the AP and accessing the other device using the connecting information, and transmitting prestored AP information to the other device, to connect the other device to the AP.

The method may further include displaying a list of at least one AP information stored in the mobile terminal apparatus, and the transmitting the AP information to the other device may include transmitting the AP information selected from the list to the other device.

The transmitting the AP information to the other device may include automatically transmitting AP information of the AP to which the mobile terminal apparatus has been connected.

The connecting information may include SSID and key information of the other device and the AP information comprises SSID and key information to connect to the AP.

Exemplary embodiments of the present inventive concept also include a mobile terminal apparatus that includes a storage which stores access point (AP) information, a nearfield wireless communication reader which reads connecting information recorded on a nearfield wireless communication tag, if the mobile terminal apparatus approaches within an range where communication with other device having the nearfield wireless communication tag is available, a communicator which disconnects from an AP and accesses the other device using the connecting information, if the connecting information is read, and a controller which controls the communicator to transmit the AP information stored on the storage to the other device, if the other device is connected.

The controller may control the communicator to disconnect communication from the other device and reconnect to the AP, if the AP information is transmitted to the other device.

The mobile terminal apparatus may further include a display, wherein the controller controls the display to display a list of AP information stored in the storage, and controls the communicator to transmit selected AP information to the other device, if the AP information is selected from the list.

The controller may control the communicator to automatically transmit to the other device the AP information of the AP to which the mobile terminal apparatus has been connected, if connected to the other device.

The connecting information may include SSID and key information of the other device and the AP information comprises SSID and key information to connect to the AP.

Exemplary embodiments of the present inventive concept also include a device that includes a nearfield wireless communication tag which provides a mobile terminal apparatus with connecting information to connect communication to the device, if a mobile terminal apparatus having the nearfield wireless communication reader approaches within an range where nearfield wireless communication with the device is available, a communicator which connects communication to the mobile terminal apparatus by implementing a soft AP function, if the mobile terminal apparatus requests access using the connecting information, and a controller which controls the communicator to connecting to an AP using AP information, if the AP information is received from the mobile terminal apparatus through the communicator.

The controller may perform a home gateway function, if connected to the AP.

The device may further include an input which receives a user command to convert to a soft AP mode implementing the soft AP function or a Wi-Fi direct mode.

The connecting information may include SSID and key information of the device and the AP information comprises SSID and key information to connect to the AP.

Exemplary embodiments of the present inventive concept also include a network system that includes a first device comprising a nearfield wireless communication tag, and a second device comprising a nearfield wireless communication reader, wherein the second device receives connecting information regarding the first device recorded on the nearfield wireless communication tag through the nearfield wireless communication reader, if the second device locates within an range where nearfield wireless communication with the first device is available, and connecting communication with the first device using the received connecting information, and the first device receives AP information regarding an access point (AP) from the second device, if the first device is connected to the second device, and accesses the AP using the received AP information.

Exemplary embodiments of the present inventive concept also include a mobile terminal apparatus, comprising: a nearfield wireless communication reader to read connection information from a device having a nearfield wireless communication tag; a controller to disconnect from a currently connected AP after the connection information is read and to provide an instruction to connect to the device; and a communicator to connect to the device using the read connecting information according to the instruction from the controller.

In an exemplary embodiment, the mobile further includes: a storage to store AP information, wherein the controller controls the communicator to transmit the stored AP information to the device upon the connection to the device.

In an exemplary embodiment, the transmitted AP information is at least one AP information selected by a user among a plurality of AP information pre-stored in the storage.

In an exemplary embodiment, mobile device further includes: a display to display a list of the plurality of stored AP information; and a selector to select the at least one AP information from the list to be transmitted to the device.

In an exemplary embodiment, the transmitted AP information is AP information of a previously connected AP.

In an exemplary embodiment, the nearfield wireless communication reader includes: antenna coils to emit electromagnetic waves; and a wireless frequency module to read RF signals emitted from the nearfield wireless communication tag in response to the emitted electromagnetic waves and perform demodulating and decoding of the received RF signals to detect the connecting information loaded in the RF signals.

Exemplary embodiments of the present inventive concept also include a method of providing AP information of mobile terminal apparatus having a nearfield wireless communication reader, the method comprising: reading connection information from a device having a nearfield wireless communication tag; disconnecting from a currently connected AP after the connection information is read from the device and connecting to the device using the read connecting information; and transmitting stored AP information to the device upon the connection to the device.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
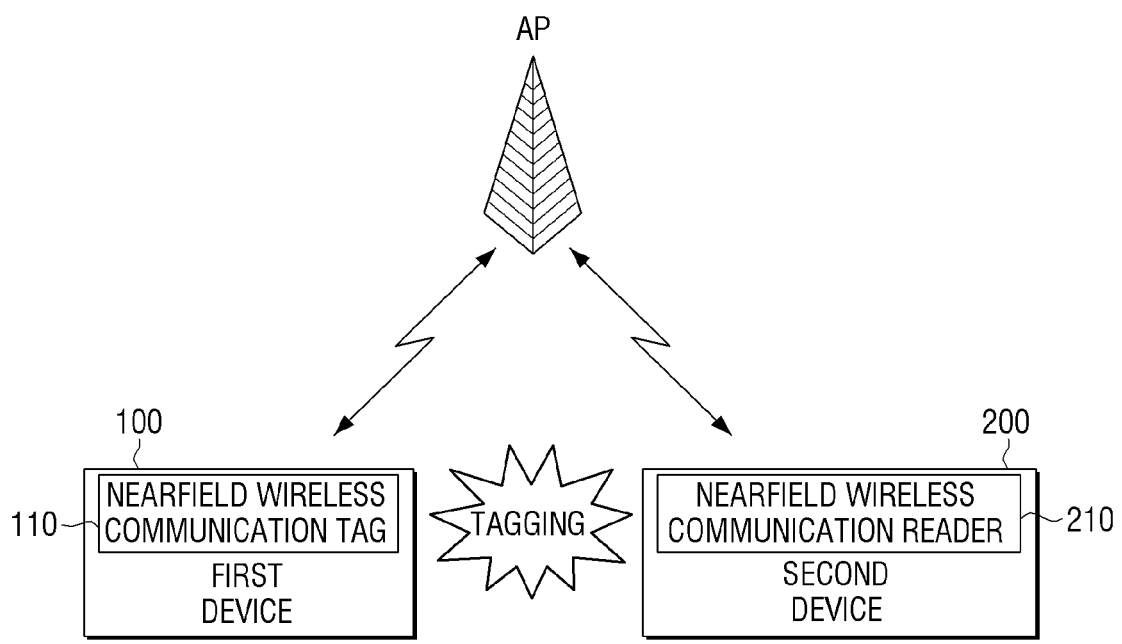
FIG. 1 is a block diagram of a device and a mobile terminal apparatus according to an exemplary embodiment.

Certain exemplary embodiments of the present inventive concept will now be described in greater detail with reference to the accompanying drawings In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a view provided to explain nearfield wireless communication among a plurality of devices according to an exemplary embodiment. A system of FIG. 1 may include a first device 100 and a second device 200. The first device 100 may include a nearfield wireless communication tag 110, and the second device 200 may include a nearfield wireless communication reader 210. In the system of FIG. 1, if the second device 200 moves toward the first device 100 and tagging occurs, the nearfield wireless communication reader 210 included in the second device 200 may read information of the nearfield wireless communication tag 110 included in the first device 100.

The operation of 'tagging' as used herein indicates that at least one of the first and second device 100, 200 may move toward each other and become located within a certain distance range where nearfield wireless communication may operate. If one device comes to the other device within the certain range, the nearfield wireless communication reader 210 of the second device 200 may read information recorded on the nearfield wireless communication tag 110 of the first device 100. For an example of nearfield wireless communication, Near Field Communication (NFC) may be utilized. NFC is contactless nearfield wireless communication using a frequency bandwidth of 13.56 MHz. If NFC is applied, data may be transmitted and received when a plurality of terminals approaches within a near field, such as within about 10 cm. If tagging is accomplished, the nearfield wireless communication reader 210 of the second device 200 may read connecting information from the nearfield wireless communication tag 110 of the first device 100. The 'connecting information' as used herein indicates information to connect to the first device 100. Specifically, connecting information may include a Service Set IDentifier (SSID) and a key of the first device 100, and so on. SSID indicates unique identifiers having 32 byte length added to each header of packets transmitted through wireless LAN.

While connecting to an AP, the second device 200 may release a connection to the AP if connecting information is provided from the first device 100. After disconnecting from the AP, the second device 200 may transmit a connecting request to the first device 100 by using connecting information.

The first device 100 may run a soft AP function or a Wi-Fi direct function, allow a connecting request of the second device 200 like an AP, and establish a connection.

When a connection is established, the second device 200 may transmit AP information stored in the second device 200 to the first device 100. AP information to be transmitted may be an SSID or a key regarding the AP previously connected. Further, one of a plurality of AP information pre-stored in the second device 200 may be transmitted to the first device 100 selectively.

The first device 100 may use AP information transmitted from the second device 200, access an AP, and establish a connection with the accessed AP. According to the above embodiment, even if a user does not input an SSID or a key in the first device 100 separately, AP connecting may be automatically implemented only with nearfield wireless communicating tagging.

As stated above, the nearfield wireless communication tag, which costs less relatively, may be included in the first device 100 and the first device 100 may operate like an AP. Thus, AP information can be provided from the second device 200 without installing the nearfield wireless communicating reader in the first device 100. Further, even if a user does not input AP information directly to the first device 100, AP connecting can be implemented more easily according to AP information provided from the second device 200.

Further, the second device 200 may use nearfield wireless communication methods, receive connecting information from the first device 100, connect to the first device 100 by using the connecting information, and provide AP information to the first device 100. Thus, the second device 200 may provide support so that AP connecting by the first device 100 can be implemented more easily. In other words, the second device 200 can provide support such that the first device 100 can easily connect to an AP.

In the above embodiments, the first device 100 and the second device 200 may be implemented as various types of apparatuses, respectively. However, to make tagging more easily, at least one of the first device 100 and the second device 200 may be implemented as mobile terminal apparatuses which may move to different locations. For instance, the first device 100 may be a home gateway, and the second device 200 may be a mobile terminal apparatus such as a mobile phone. However, this is merely an exemplary embodiment, and the first device 100 and the second device 200 may be stationery apparatus such as a TV, a PC, or a set-top box, or a mobile apparatus such as a PDA, a tablet PC, a mobile phone, or a laptop computer.

Figure 2:
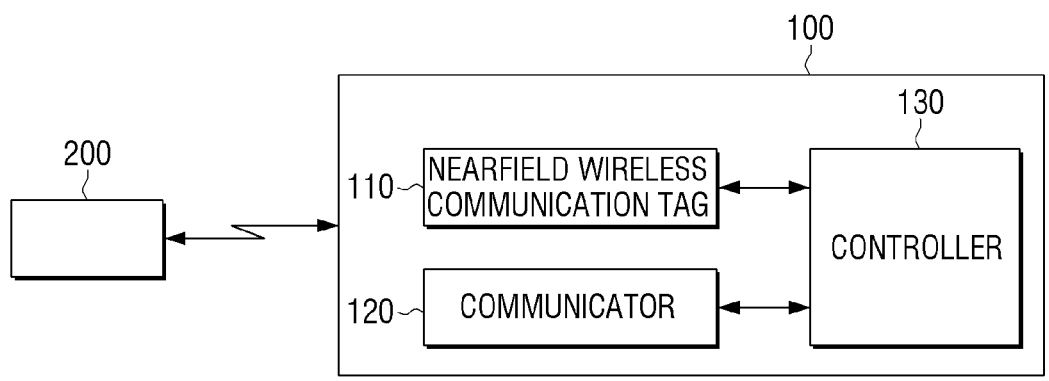
FIG. 2 is a block diagram of a device according to an exemplary embodiment.

FIG. 2 is a view provided to explain a constitution of the first device used in the system of FIG. 1. Referring to FIG. 2, the first device 100 may include a nearfield wireless communication tag 110, a communicator 120, and a controller 130.

The nearfield wireless communication tag 110 may include an integrated circuit (IC) and antenna coils. If the nearfield wireless communication tag 110 tags with the second device 200 having the nearfield wireless communication reader, the nearfield wireless communication tag 110 may operate by electromagnetic waves emitted from the nearfield wireless communication reader, and transmit RF signals carrying connecting information.

In antenna coils within the nearfield wireless communication tag 110, electric currents may be induced because of electromagnetic waves emitted from the nearfield wireless communication reader. Induced currents may be charged in a capacitor included in the nearfield wireless communication tag. The IC may be operated by the charged electric currents in the capacitor, and generate RF signals by coding pre-stored connecting information and modulating the coded information.

The nearfield wireless communication tag 110 may generate RF signals according to a preset modulating technology and coding method among various types of modulating technologies and coding methods. The 'modulating' as used herein indicates technology of changing amplitudes, frequencies, phases, or others of RF carrier signals, and loading data to the RF carrier signals. For modulating, Amplitude Shift Keying (ASK), Frequency Shift Keying (FSK), or Phase Shift Keying (PSK) may be used. The 'ASK' as used herein indicates a method of shifting a amplitude of a carrier signal according to whether an information signal in digital format is 0 or 1. For instance, if an information signal is 0, a amplitude of a carrier signal may be minimized and transmitted. If an information signal is 1, a amplitude of a carrier signal is maximized and transmitted. If 2-step amplitudes are used, 1 bit may be transmitted. However, if 4-step different amplitudes are used, a plurality of bits may be transmitted simultaneously. The 'FSK' as used herein indicates a method of allocating 0 and 1 bit digital signals to 2 types of frequencies (low frequency, high frequency) and transmitting the same. For instance, if an information signal is 0, a frequency lower than a carrier frequency may be generated and transmitted. If an information signal is 1, a frequency higher than a carrier frequency may be generated and transmitted. The 'PSK' as used herein indicates a method of shifting a phase of a carrier signal according to transmitted data. Degree of phase shift may be determined by data. If transmitted data are 0, a phase of a carrier frequency may be transited by 180° and information may be transmitted on a bit basis one by one. If transmitted data are 1, a phase of a carrier frequency may be transited by 90° and information may be transmitted on a bit basis one by one.

Besides, for instance of coding methods, the modified Miller coding method or Manchester coding method may be used.

According to an embodiment, modulating technology and coding methods which may be used in the nearfield wireless communicating tag 110 may be properly determined by considering an apparatus type and a communicating speed. For instance, if the nearfield wireless communication tag 110 is a passive type which is driven by electric currents induced by electromagnetic waves emitted from the nearfield wireless communication reader without having a battery, the ASK technology and the Manchester coding method can be utilized. Meanwhile, if the nearfield wireless communication tag 110 is an active type where the tag 110 has a battery, the ASK technology and modified Miller coding method may be utilized at 106 kbps, or the ASK technology and Manchester coding method may be utilized at 212 kbps or at 424 kbps. This coding method is merely an example, and does not necessarily need to be limited to this type of method.

As described above, the nearfield wireless communication tag 110 may provide connecting information to the second device 200, if nearfield wireless communication tagging is made with the second device 200 having the nearfield wireless communication reader. The connecting information may be provided from an internal storage of the nearfield wireless communication tag 110 or an internal storage of the first device 100.

The controller 130 may run a soft AP function or a Wi-Fi direct function, and control the communicator 120 to run on soft AP mode in which the second device 200 can connect. The soft AP mode indicates a mode of realizing a function of the AP using software. Converting to the soft AP mode may be processed according to a user command, or processed automatically according to a default setting condition in the process in which the first device 100 turns on and initializes.

The communicator 120 may receive AP information from the second device 200, if the second device 200 uses the connecting information and performs a pairing with the first device 100. If AP information is received through the communicator 120, the controller 130 may convert the soft AP mode to station mode, and control the communicator 120 to use the received AP information and to connect to an AP.

If the first device 100 is a home gateway, the controller 130 may implement the home gateway function when connecting to an AP. In other words, the controller 130 may play a role of a bridge by connecting external networks such as the internet and home networks. The controller 130 may control or manage electronic apparatuses connected to the home networks according to controlling signals input by the external networks.

Although not illustrated in FIG. 2, the first device 100 may additionally include an input unit (not illustrated) which may receive a user command to convert to the soft AP mode. The input unit may be implemented as a button, a touch pad, a voice recognizing module, or a motion recognizing module included in the first device 100. Thus, a user may select a button or a touch pad, pronounce trigger voices, or act trigger motions to convert the first device 100 to the soft AP mode.

Meanwhile, upon connecting to the AP, the controller 130 may inform the second device 200 about the completion of the connection.

Figure 3:
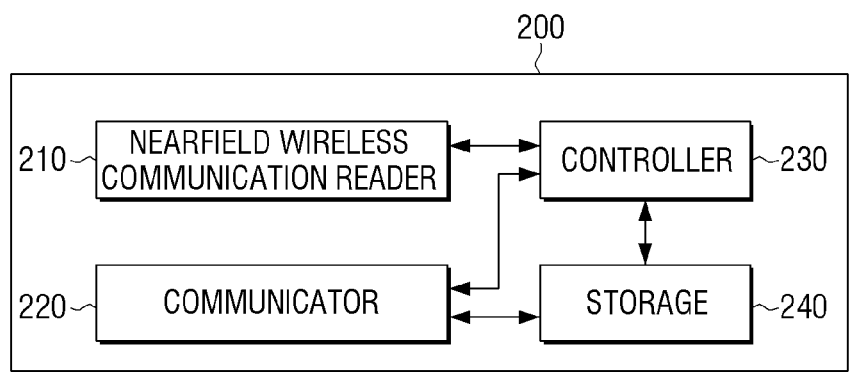
FIG. 3 is a block diagram of a mobile terminal apparatus according to an exemplary embodiment.

FIG. 3 is a block diagram of the second device 200 used in the system of FIG. 1. Referring to FIG. 3, the second device 200 may include a nearfield wireless communicating reader 210, a communicator 220, a controller 230, and a storage 240.

The storage 240 may store AP information. The AP information includes SSID and key information. At least one of AP information may be stored in the storage 240 of the second device 200.

The nearfield wireless communication reader 210 may access the nearfield wireless communication tag included in the external device, that is, a first device 100, and may read connecting information, if nearfield wireless communication tagging with the external device 100 is implemented. The nearfield wireless communication reader 210 may include a wireless frequency module and antenna coils. The nearfield wireless communication reader 210 may emit electromagnetic waves through the antenna coils. Thus, electric currents may be induced in the nearfield wireless communication tag 110 according to electromagnetic induction method and the IC of the nearfield wireless communication tag 110 may operate. The IC of the nearfield wireless communication tag 110 may transmit RF signals including connecting information as mentioned above. The wireless frequency module within the nearfield wireless communication reader 210 may receive RF signals through the antenna coils, perform demodulating and decoding of the received RF signals, and detect connecting information loaded in the RF signals. Demodulating and decoding may be implemented according to a method corresponding to modulating and coding used in the nearfield wireless communication tag 110, which will not be further described below for the sake of brevity.

The controller 230 may disconnect from the AP that is currently connected, if connecting information is received through the nearfield wireless communication reader 210, and control the communicator 220 to connect to the first device 100.

The communicator 220 may connect to the first device 100 using the connecting information read at the nearfield wireless communication reader 210 to establish a connection. Communication methods with the first device 100 may be any of various methods such as a Bluetooth or ZigBee type connection. Upon connecting to the first device 100, the controller 230 may control the communicator 220 to transmit AP information stored in the storage 240 to the first device 100. After transmitting AP information completes successfully, the controller 230 may control the communicator 220 to disconnect from the first device 100 and reconnect to an AP.

Meanwhile, as described above, a plurality of AP information may be stored in the storage 240. In this case, the controller 230 may provide an opportunity that a user can select AP information to be transmitted to the first device 100.

Figure 4:
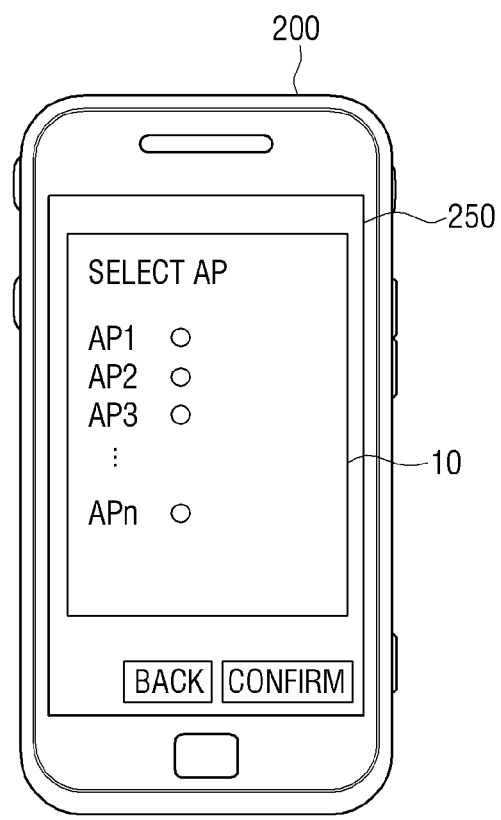
FIG. 4 is an exemplary list of Access Point (AP) information displayed on a screen of a mobile terminal apparatus.

FIG. 4 is a view provided to explain an exemplary screen of the second device 200 to select AP information. Referring to FIG. 4, the second device 200 may further include a display 250.

The controller 230 may control the display 250 to display a list 10 of AP information stored in the storage 240 after tagging completes. If a user selects at least one AP information from the list 10, the controller 230 may control the communicator 220 to transmit the selected AP information to the first device 100.

Meanwhile, according to another embodiment, AP information may be transmitted automatically without displaying a list of AP information. In this case, the AP information to be transmitted may indicate an AP in which the second device 200 has been previously connected. In other words, when connecting (i.e., pairing) to the first device 100, the controller 230 may control the communicator 220 to automatically transmit AP information of the previous AP to the first device 100.

Referring to FIG. 4, the second device 200 may be implemented as a mobile terminal apparatus.

As described above, the mobile terminal apparatus according to an exemplary embodiment may connect to another device that does not have AP information (i.e., the first device 100) with convenient methods, and deliver AP information through the connecting. Thus, because another device can connect to an AP more conveniently with the help from the mobile terminal apparatus, the mobile terminal apparatus supports AP connecting of another device.

Figure 5:
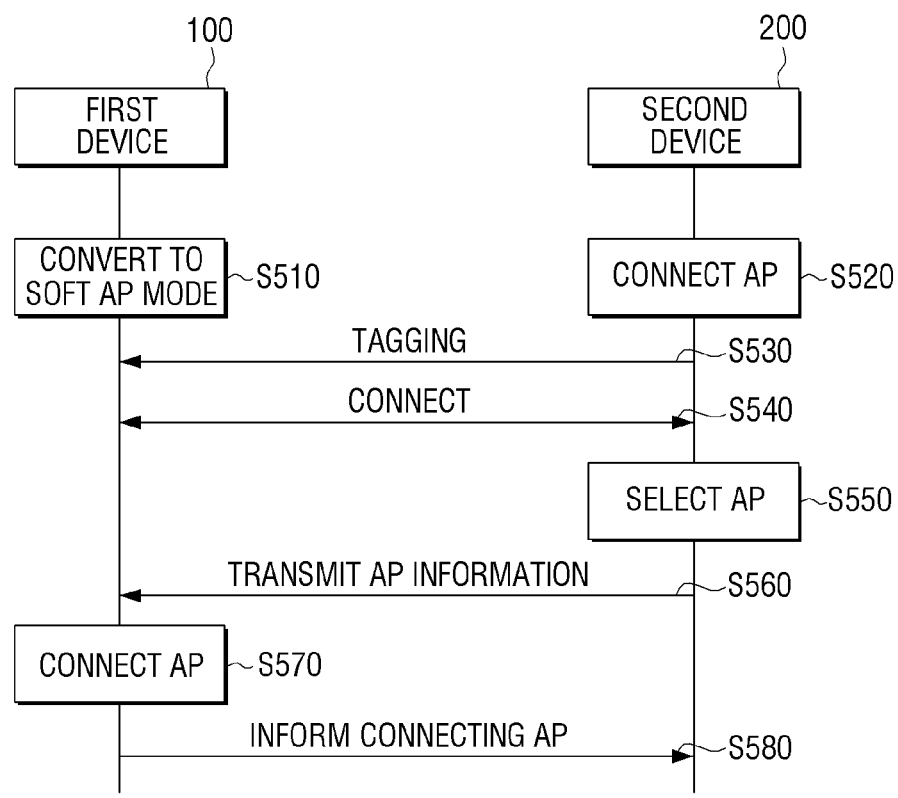
FIG. 5 is a view provided to explain a process of connecting to an AP by using a device and a mobile terminal apparatus.

FIG. 5 is a timing view provided to explain a method of connecting to an AP according to an exemplary embodiment. Referring to FIG. 5, if a user presses a button of the first device 100, the mode of the first device 100 may be converted to the soft AP mode at operation S510. In this case, if the second device 200, which connects to an AP at operation S520, moves toward the first device 100 and implements tagging at operation S530, information stored in the first device 100 may be provided to the second device 200.

The second device 200 may use connecting information and perform communication with the first device 100 at operation S540. Before performing communication, the second device 200 may disconnect from the AP that is currently connected.

If the second device 200 becomes connected to the first device 100 at operation S540, the second device 200 may provide a screen (see FIG. 4) to select an AP so that a user can select an AP at operation S550. If a user selects one AP on the screen, AP information regarding the selected AP may be transmitted to the first device 100 at operation S560.

If AP information is transmitted, the first device 100 may transmit a confirmation message informing that transmitting information from the second device 200 is completed. After transmitting the confirmation message, the first device 100 may end the soft AP mode, convert to the station mode, and connect to an AP using the AP information received from the second device 200 at operation S570. If the connecting process completes, the first device 100 may inform the second device 200 of the completion of connecting to an AP at operation S580.

If an AP connection by the first device 100 is informed to the second device 200 from the first device 100, the second device 200 may disconnect from the first device 100 and connect to the previous AP again.

Referring to FIG. 5, the first device 100 and the second device 200 may perform communication according to various methods such as Wi-Fi, Bluetooth, or ZigBee. Further, without providing a screen to select an AP, an embodiment of automatically transmitting AP information may be implemented.

Figure 6:
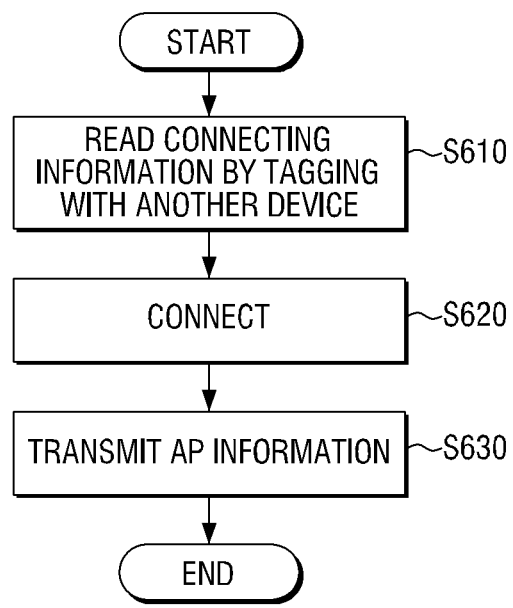
FIG. 6 is a flowchart provided to explain a method of providing AP information of a mobile terminal apparatus according to an exemplary embodiment.

FIG. 6 is a flowchart provided to explain a method of providing AP information in the above second device 200. Referring to FIG. 6, the second device 200 may read connecting information from the nearfield wireless communication tag included in the first device 100 at operation S610. After reading the connecting information, the second device 200 may use the read connecting information and implement pairing at operation S620, and transmit AP information to the first device 100 at operation S630.

Although not illustrated in FIG. 6, the above method may additionally include displaying a list of at least one AP information pre-stored in the second device 200. In this case, a user may select AP information on the list, and the selected AP information may be transmitted to the first device 100 at operation S630.

Additionally, AP information regarding the AP connected to the second device 200 may be automatically transmitted to the first device 100.

Further, the second device 200 may disconnect from the AP that is currently connected before pairing. After transmission of AP information to the first device 100 is successfully performed, the second device 200 may restore connecting to the AP.

Figure 7:
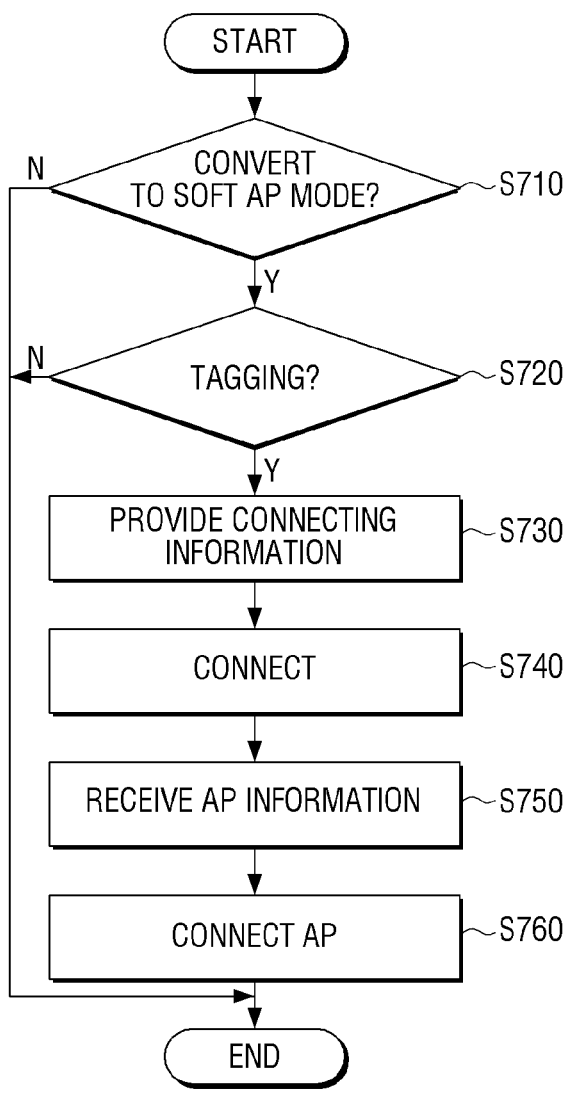
FIG. 7 is a flowchart provided to explain a method of connecting to an AP of a device according to an exemplary embodiment.

FIG. 7 is a flowchart provided to explain a method of connecting to an AP of the first device 100 according to an exemplary embodiment. Referring to FIG. 7, according to a user command, after converting to the soft AP mode at operation S710, if nearfield wireless communication tagging is implemented at operation S720, connecting information stored in the first device 100 may be provided to the second device 200 at operation S730.

Thus, if pairing/connecting with the second device 200 is implemented at operation S740, the first device 100 may receive AP information transmitted from the second device 200 at operation S750. If AP information is received by the first device 100, the first device 100 may inform the second device 200 about the reception of the AP information. The first device 100 may convert the soft AP mode status to the station mode, and access and connect to an AP using the received AP information at operation S760. If connecting is implemented, the first device 100 may transmit a message to the second device 200, indicating that the connecting process is completed. Similar to the above embodiment, if the first device 100 is implemented as a home gateway, operating a home gateway function may be further included.

As a result, according to various embodiments, when wireless LAN apparatuses are installed in various places such as homes or offices, a user can simply connect to an AP using a mobile terminal apparatus without having to enter a setting page and connect to an AP.

Even though the above embodiments describe that connecting information may be provided by nearfield wireless communication technology, connecting information can also be provided by general RFID technology as well as nearfield wireless communication technology.

Meanwhile, methods of the above various embodiments may be implemented by simply upgrading software of a conventional device and or mobile terminal apparatuses. For instance, in case of a home gateway, the nearfield wireless communication tag may be simply manufactured such as a sticker format, and attached to a home gateway. And applications implementing soft AP function and the method of FIG. 7 can be installed or firmware may be upgraded to implement functions according to the above various embodiments.

Specifically, according to an exemplary embodiment, a non-transitory computer readable medium may be provided, in which the non-transitory computer readable medium stores programs consecutively implementing operations of converting to the soft AP mode, operating communication in response to a paring request if pairing request of another device is received based on connecting information provided to another device by tagging, requesting and receiving AP information to another device if connected, and connecting to an AP using AP information.

Further, lots of current mobile terminal apparatuses such as mobile phones include the nearfield wireless communication reader such as NFC module. In this case, applications implementing algorithms of FIG. 6 may be installed in the mobile terminal apparatuses, and functions according to the above various embodiments may be implemented.

Specifically, according to another exemplary embodiment, non-transitory computer readable medium may be provided, in which the non-transitory computer readable medium storing programs consecutively implementing operations of connecting to another device by using connecting information if the connecting information is received after tagging with another device, and transmitting AP information to another device if connected.

The non-transitory computer readable medium may be the medium which stores data semi-permanently and which can be read by apparatuses, and not the medium that temporarily stores data such as a register, a cache, or a memory. Specifically, the above applications or programs may be stored and provided in the non-transitory computer readable medium such as a CD, a DVD, a hard disk, a Blu-ray disk, a USB, a memory card, or a ROM.

Further, although the above block diagrams of the first and second device do not illustrate bus; communication between components within the first and second device may be implemented through a bus. Further, each device may further include a memory for storing a message to be transmitted, and a processor such as a CPU or micro processor for implementing the above various steps.

The foregoing exemplary embodiments and utilities are merely exemplary and are not to be construed as limiting the present inventive concept. The present teachings can be readily applied to other types of apparatuses. Also, the description of the exemplary embodiments of the present inventive concept is intended to be illustrative, and not to limit the scope of the claims.

What is claimed is:

1. A mobile terminal apparatus, comprising:
a display configured to display a list of access point (AP) information of a plurality of access points;
a communicator configured to connect to an AP;
a storage configured to store the list of AP information;
a nearfield wireless communication reader configured to read connecting information recorded on a nearfield wireless communication tag of a device;
a controller configured to control the mobile terminal apparatus to:
connect to the AP,
receive AP information from the AP,
add the received AP information to the displayed list of AP information,
disconnect the mobile terminal apparatus from the AP,
connect to the device using the connecting information,
receive, from a user, a selection of AP information from the displayed list of AP information;
transmit the selected AP information to the device,
receive a response from the device that the device has connected to a selected AP,
disconnect the mobile terminal apparatus from the device, and
reconnect the mobile terminal apparatus to the AP.

2. The mobile terminal apparatus of claim 1, wherein the connecting information comprises SSID and key information of the device and the AP information comprises SSID and key information to connect to the AP.

3. A method of providing access point (AP) information, the method comprising:
connecting a mobile terminal apparatus to an AP;
receiving, by the mobile terminal apparatus, AP information from the AP;
storing, by the mobile terminal apparatus, a plurality of pieces of AP information of a plurality of access points including the received AP information from the AP;
reading, by a nearfield wireless communication reader of the mobile terminal apparatus, connection information from a nearfield wireless communication tag of a device;
disconnecting the mobile terminal apparatus from the currently connected AP after the connection information is read from the device;
connecting the mobile terminal apparatus to the device using the read connecting information;
displaying the plurality of pieces of AP information;
receiving, from a user, a selection of AP information from the plurality of pieces of AP information;
transmitting the selected AP information to the device;
receiving a response from the device that the device has connected to a selected AP,
disconnecting the mobile terminal apparatus from the device; and
reconnecting the mobile terminal apparatus to the AP.

4. The method of claim 3, wherein the connecting information comprises SSID and key information of the device and the AP information comprises SSID and key information to connect to the AP.

* * * * *